(12) United States Patent
MacNeil et al.

(10) Patent No.: US 12,467,270 B2
(45) Date of Patent: Nov. 11, 2025

(54) HYDRODEMOLITION APPARATUS FOR OVERHANGING INCLINED SURFACES

(71) Applicant: Mac & Mac Hydrodemolition Inc., Surrey (CA)

(72) Inventors: Gerard J. MacNeil, Surrey (CA); Gordon MacNeil, Surrey (CA); Jesse MacNeil, Surrey (CA); Vernon Bose, Surrey (CA)

(73) Assignee: Mac & Mac Hydrodemolition Inc., Surrey (CA)

( * ) Notice: Subject to any disclaimer, the term of this patent is extended or adjusted under 35 U.S.C. 154(b) by 301 days.

(21) Appl. No.: 18/328,690

(22) Filed: Jun. 2, 2023

(65) Prior Publication Data

US 2023/0392400 A1    Dec. 7, 2023

(30) Foreign Application Priority Data

Jun. 3, 2022 (CA) .................................. CA 3161579

(51) Int. Cl.
   *E04G 23/08* (2006.01)
(52) U.S. Cl.
   CPC .................................. *E04G 23/081* (2013.01)
(58) Field of Classification Search
   CPC .................................................. E04G 23/081
   See application file for complete search history.

(56) References Cited

U.S. PATENT DOCUMENTS

| | | |
|---|---|---|
| 3,557,928 A | 1/1971 | Cromwell et al. |
| 3,576,582 A | 4/1971 | Smith |
| 3,603,264 A | 9/1971 | Arx |
| 5,091,016 A | 2/1992 | Krajicek et al. |
| 5,282,575 A | 2/1994 | Krulick et al. |
| 5,405,086 A | 4/1995 | Kraenzle |
| 5,571,977 A | 11/1996 | Kipp |
| 6,206,016 B1 | 3/2001 | Macneil et al. |
| 6,390,105 B1 | 5/2002 | Ramsey |
| 8,191,972 B2 | 6/2012 | Macneil et al. |
| RE44,518 E | 10/2013 | Macneil et al. |
| 8,814,274 B2 | 8/2014 | Macneil et al. |
| 10,758,952 B2 | 9/2020 | Macneil et al. |
| 10,781,563 B2 | 9/2020 | Macneil et al. |
| 10,981,202 B2 | 4/2021 | Macneil et al. |
| 11,155,245 B2 | 10/2021 | Detrick |
| 11,246,318 B1 | 2/2022 | Bullard et al. |
| 11,344,932 B2 | 5/2022 | He |
| 11,551,920 B2 | 1/2023 | Furuta |

(Continued)

FOREIGN PATENT DOCUMENTS

| | | |
|---|---|---|
| CA | 2412691 A1 | 5/2004 |
| CA | 2671156 A1 | 3/2009 |

(Continued)

*Primary Examiner* — Qingzhang Zhou
(74) *Attorney, Agent, or Firm* — Stoel Rives LLP (57) ABSTRACT

A hydrodemolition apparatus provides multiple degrees of freedom enabling the treatment of overhanging or vertically inclined surfaces. A nozzle wall or track is pivotable to present the nozzles substantially normal to the overhanging or inclined surface. The nozzle wall or track is positioned proximate to the inclined surface by a combination of a vertically displaceable carriageway, a laterally displaceable carriage and an elongated member that terminates in the pivotable nozzle wall or track.

4 Claims, 10 Drawing Sheets

(56) References Cited

U.S. PATENT DOCUMENTS

| | | | | |
|---|---|---|---|---|
| 2006/0022001 A1* | 2/2006 | Linsmeier | ............... | A62C 31/22 |
| | | | | 222/608 |
| 2006/0087168 A1* | 4/2006 | MacNeil | ............... | E04G 23/081 |
| | | | | 299/17 |
| 2011/0056355 A1* | 3/2011 | MacNeil | ................. | B26F 3/004 |
| | | | | 83/177 |

FOREIGN PATENT DOCUMENTS

| CA | 2412693 C | 3/2010 |
|---|---|---|
| CA | 2689767 A1 | 8/2010 |
| CA | 2485819 C | 7/2011 |
| CA | 2585903 C | 3/2012 |
| CA | 2302083 C | 5/2012 |
| CA | 2730790 C | 11/2015 |
| CA | 2858738 A1 | 1/2016 |
| CA | 2812334 C | 1/2018 |
| CA | 2755007 C | 1/2019 |
| DE | 29802660 U1 | 5/1998 |
| MX | 2009002025 A | 8/2010 |
| WO | 1995031295 A1 | 11/1995 |

\* cited by examiner

HYDRODEMOLITION APPARATUS FOR OVERHANGING INCLINED SURFACES

FIELD OF THE INVENTION

This invention relates to hydrodemolishing or hydrotreating surfaces. In particular, the invention is directed to a method and apparatus to hydrotreat overhanging inclined surfaces.

BACKGROUND OF THE INVENTION

U.S. Pat. No. 8,814,274 discloses a hydrodemolition apparatus for treating vertical walls. A static support frame includes a carriage that can be raised and lowered along the support frame. A carrier bar, which may be straight or curved, carries nozzles that reciprocate back and forth along the length of the carrier bar.

U.S. Pat. No. 8,191,972 and Canadian Patent No. 2,585,903 disclose hydrodemolition apparatus for treating inclined walls, such as the curved cylindrical wall of a reactor. The apparatus comprises a frame and a carriage configured to move horizontally and vertically to treat a portion of the wall. The carriage may also be displaced inward and outward so to accommodate the curvature of the wall as the nozzle assembly moves laterally to track the cylindrical curve.

Neither of those references is adapted to treat overhanging surfaces that are angled in relation to the vertical plane. The present invention is directed to hydrodemolition apparatus for treating overhanging inclined walls and surfaces. The invention will be useful in treating outwardly extending inclined walls of buildings and surfaces that present an outwardly inclined or outwardly curved surface to be treated, such as the hull of a marine vessel.

SUMMARY OF THE INVENTION

In one aspect, the invention comprises a vertically extending frame. A beam, truss or other carriageway extends horizontally on or within the frame, for example between two vertically-extending sides of the frame.

The horizontally-extending carriageway is adapted to move vertically along the frame.

A carriage is mounted for horizontal displacement along the carriageway. The carriage in turn supports an elongated member that extends and retracts in a direction perpendicular to the carriageway.

An end of the elongated member supports a substantially planar nozzle wall that may be pivoted about a horizontal axis in relation to the elongated member so as to present the nozzle wall at an inclined angle with respect to the vertical plane. The nozzle wall comprises at least one high-pressure water nozzle adapted to reciprocate along a longitudinal axis of the nozzle wall, for example along slots in the nozzle wall. Pivoting of the nozzle wall about the horizontal axis orients the nozzle to direct high-pressure water at an upward angle. As a result, a jet of high-pressure water may be directed substantially normal to an overhanging inclined surface for treatment.

The features of the invention provide several degrees of freedom to enable the treatment of selected areas of an overhanging inclined surface, including compound or curved inclined surfaces: the carriageway may be displaced vertically along the frame; the nozzle wall may be displaced horizontally with respect to the carriageway; the elongated member that is mounted on the carriage may be retraced and extended horizontally and the nozzle may reciprocate along a longitudinal axis of the nozzle wall. Significantly, the pivotability of the nozzle wall with respect to the vertical allows an effective optimal orientation of the nozzle toward an overhanging inclined surface.

According to another aspect of the invention, an apparatus for treating a surface having an inclination with respect to the vertical plane using high-pressure water comprises a vertically extending frame, a horizontally extending carriageway movable in the vertical direction along the frame, a carriage displaceable horizontally along the carriageway, an elongated member mounted to the carriage, the elongated member extendible and retractable in a direction perpendicular to the carriageway, a nozzle mounted at an end of the elongated member and adapted to pivot about a horizontal axis so as to present the nozzle at an inclination with respect to the vertical plane, at least one high-pressure water nozzle adapted to reciprocate along a longitudinal axis of the nozzle, wherein pivoting the nozzle about the horizontal axis orients the nozzle to direct high-pressure water at an upward angle.

According to a further aspect, the nozzle is mounted in a substantially planar nozzle wall and the nozzle wall comprises at least one slot extending along a longitudinal axis of the nozzle wall and the at least one high pressure water nozzle is adapted to reciprocate along the at least one slot. The nozzle wall may be adapted to pivot about the horizontal axis by means of a hydraulic cylinder extending between the nozzle wall and the elongated member.

According to another aspect of the invention, a method of treating a surface using high-pressure water, the surface having a portion that is inclined with respect to a vertical plane, comprises: providing an apparatus having a vertically extending frame, a horizontally extending carriageway movable in the vertical direction along the frame, a carriage displaceable horizontally along the carriageway, an elongated member mounted to the carriage, the elongated member extendible and retractable in a direction perpendicular to the carriageway, a straight elongated track mounted to an end of the elongated member for guiding one or more high-pressure water nozzles along the track, and, the track pivotable about a horizontal axis so as to present the track at an inclination with respect to the vertical plane, positioning the frame adjacent the surface in a first position and while the frame is in the first position positioning the carriageway at a vertical height in relation to the frame, the carriage in relation to the carriageway and the elongated member in relation to the carriage, so as to present the track proximate to the portion of the surface, angling the track such that a longitudinal axis of the track is substantially parallel to the portion or to a tangent to the portion, and, actuating the high-pressure nozzles to direct water toward the portion.

According to a further aspect, the method further comprises the steps of: moving the nozzles along the track, and, moving the carriage horizontally along the carriageway, as the nozzles emit high-pressure water toward the surface whereby to treat a horizontal swatch of the surface. the method may still further comprise the steps of: modifying a vertical position of the carriageway in relation to the frame, and, repeating the previous steps in the modified vertical position of the carriageway.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which.

For the sake of simplifying the views, the apparatus of the preferred embodiment is illustrated without hydraulic, air, electrical and water hose lines.

DETAILED DESCRIPTION OF THE PREFERRED EMBODIMENT(S)

Figure 5:
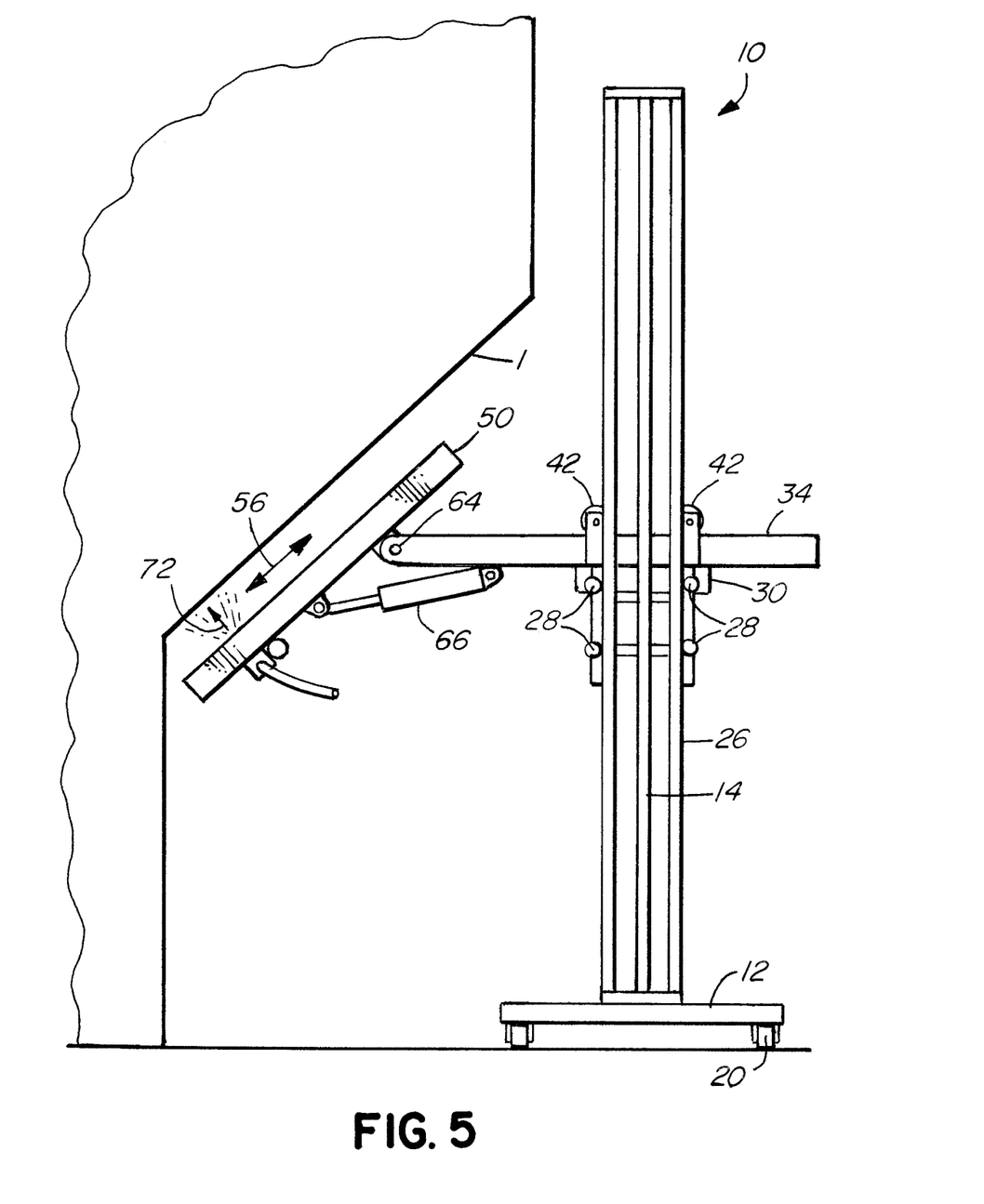
FIG. 5 is a side elevation of the apparatus treating an overhanging inclined surface (in this case a wall)
Figure 6:
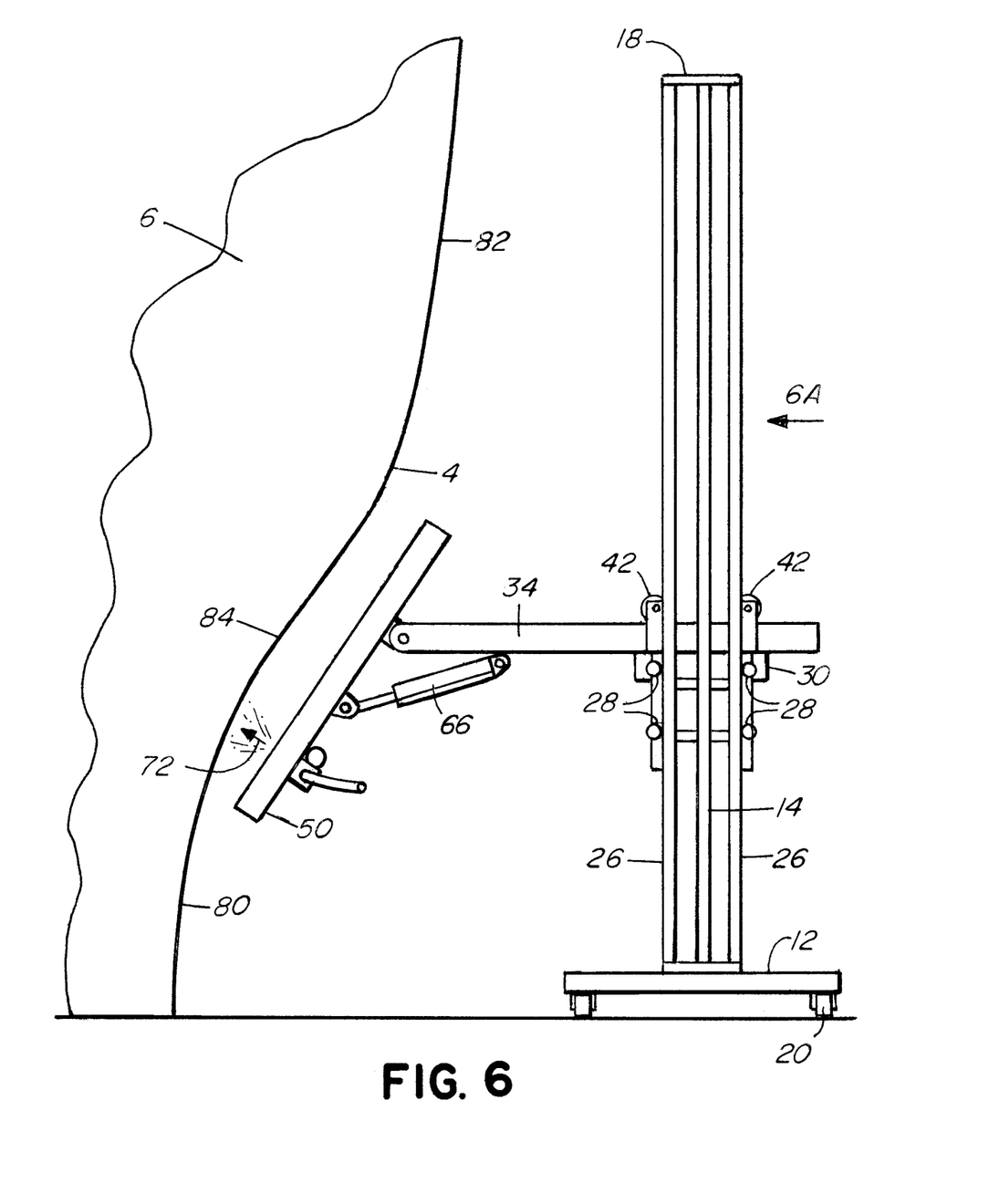
FIG. 6 is a side elevation of the apparatus treating a first section of the underside of a boat hull.
Figure 7:
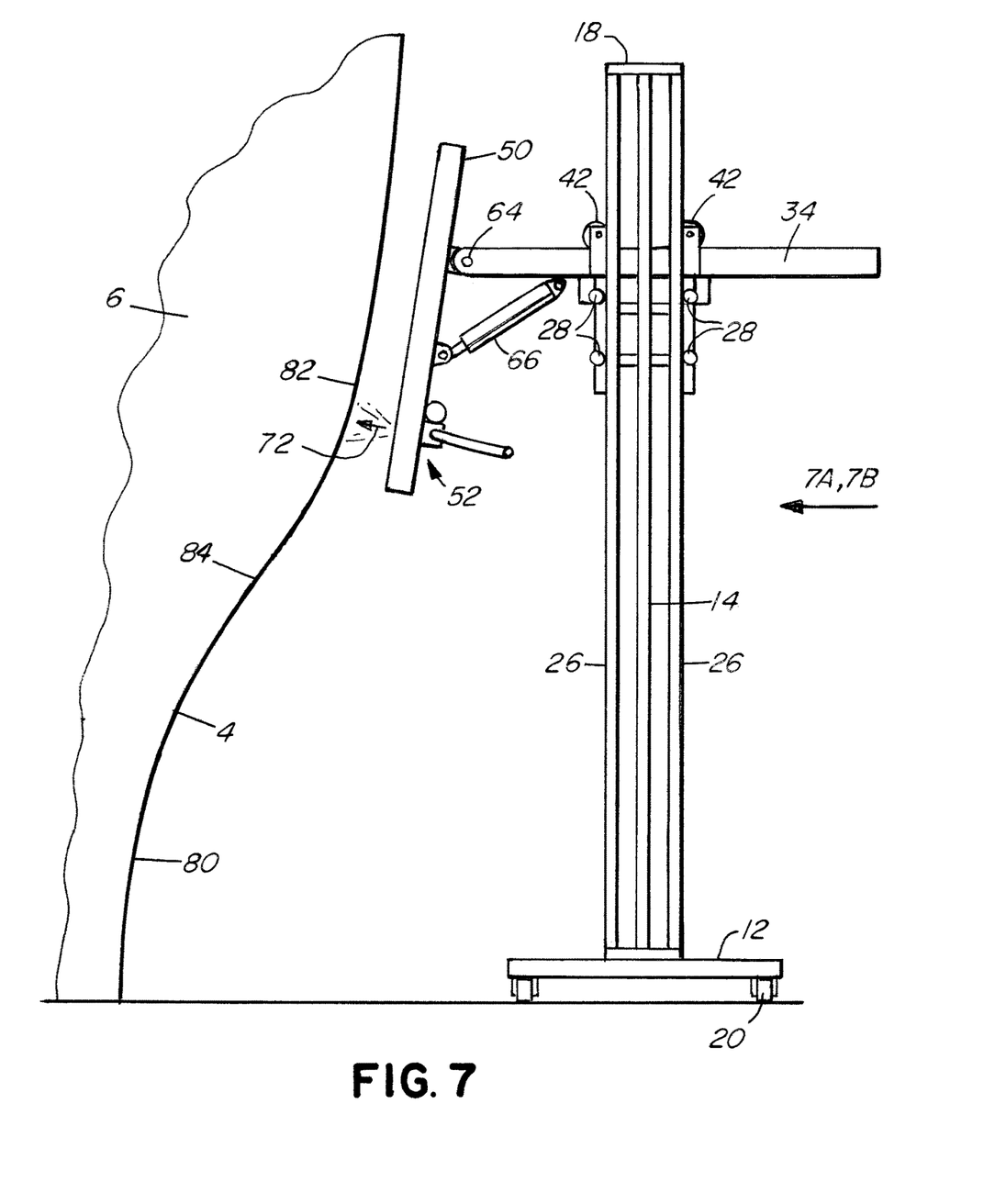
FIG. 7 is a side elevation of the apparatus treating a second section of the underside of a boat hull.

Referring to FIGS. 5, 6 and 7, the apparatus of the invention is adapted to treat an overhanging inclined surface 1 that lies at a non-vertical angle and that extends outward and upward. The surface may be a wall as shown in FIG. 5 or a compound curved surface 4 such as a boat hull 6 as shown in FIGS. 6 and 7.

Figure 1:
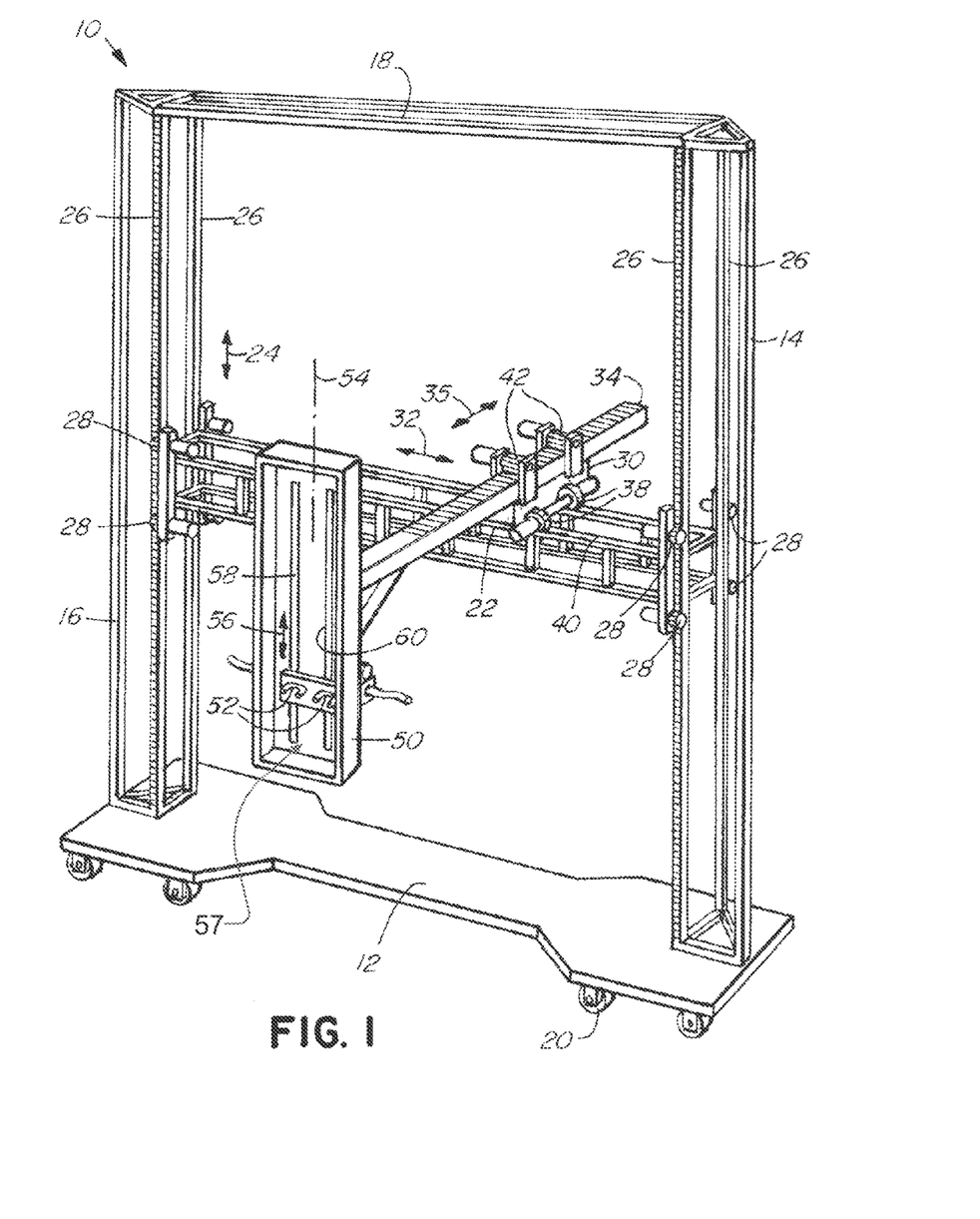
FIG. 1 is a front perspective view of the apparatus according to the preferred embodiment.
Figure 1A:
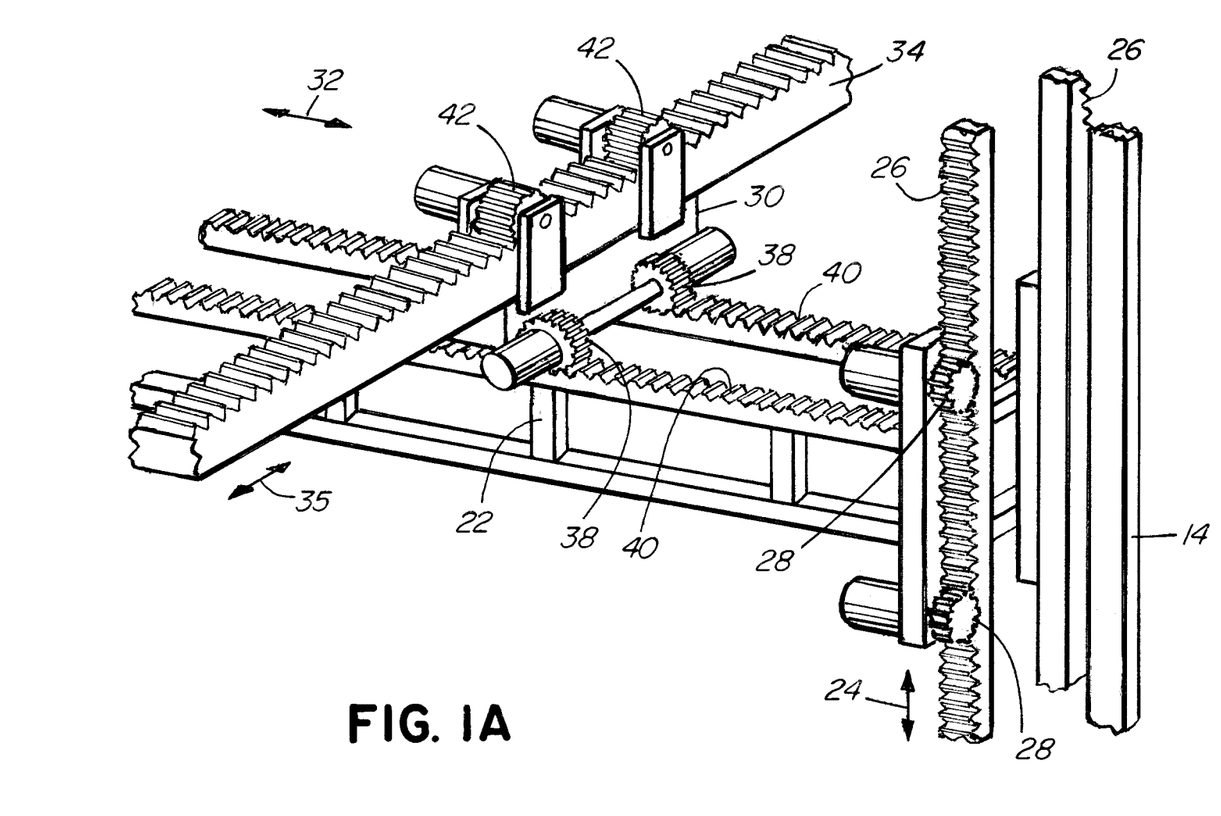
FIG. 1A is a detail perspective view of a portion of the carriageway and frame of the apparatus of FIG. 1.

Referring to FIGS. 1 and 1A, a vertically-extending frame 10 may consist of a base 12 and vertically extending sides 14, 16. Cross-brace members 18 are provided as needed for structural rigidity. The frame may be installed on the ground or on a vehicle, vessel or platform. If installed on the ground, it may be provided with ground-engaging wheels 20.

A carriageway 22 extends horizontally on or within the frame, for example between the two vertically-extending sides 14, 16 of the frame 10. The carriageway 22 may be a single solid beam or a truss arrangement of structural elements as shown in FIG. 1. The carriageway 22 is adapted to travel vertically along the sides 14, 16 of the frame as indicated by arrow 24, such as by means of a rack 26 formed in the vertical sides 14, 16 and pinions 28 mounted on the ends of the carriageway.

A carriage 30 is mounted on the carriageway 22 for horizontal displacement along the carriageway in the direction of arrow 32, such as by pinions 38 attached to carriage 30 and meshing with a rack 40 formed on the carriageway 22.

The carriage 30 supports an elongated member 34 extending perpendicularly to the carriageway 22.

The elongated member 34 may in turn be retracted and extended from the carriageway 22, as indicated by arrow 35, by means of rollers or pinions 42 attached to carriage 30.

It will be appreciated that vertical displacement of the carriageway 22 in relation to the frame 10, horizontal displacement of the carriage 30 on the carriageway 22 and extension and retraction of the elongated member 34 in relation to the carriage may be actuated by any suitable means, such as motors or pulleys.

Figures 2, 3:
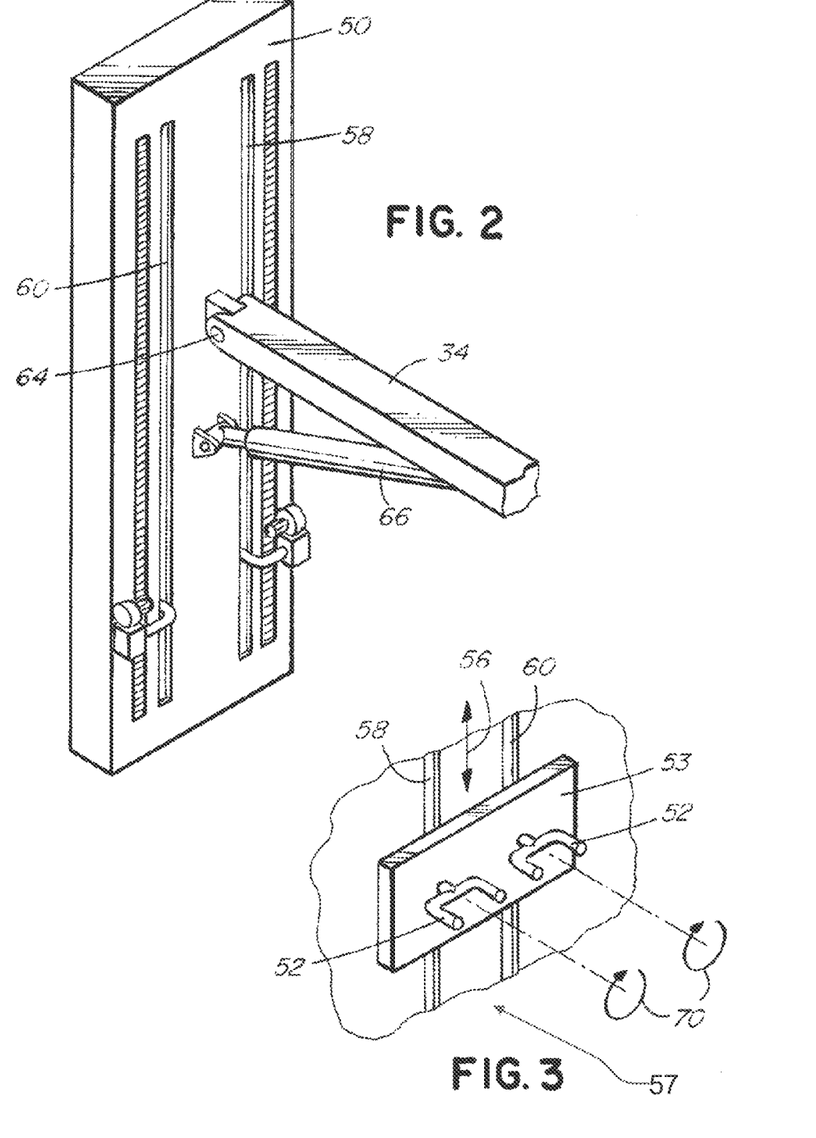
FIG. 2 is a rear perspective view of the nozzle wall and showing the pivoting attachment of the nozzle wall to the elongated member.
FIG. 3 is a front perspective view of a portion of the nozzle carrier.

Referring to FIGS. 1 to 3, an end of the elongated member 34 supports a substantially planar nozzle wall 50. The nozzle wall 50 is the staging structure for at least one, but preferably two high-pressure water nozzles 52 mounted on a nozzle carrier 53 that reciprocates along a longitudinal axis 54 of the nozzle wall 50 in the direction indicated by arrow 56 along a straight elongated track 57 comprising slots 58, 60 formed in the nozzle wall 50.

Figure 4:
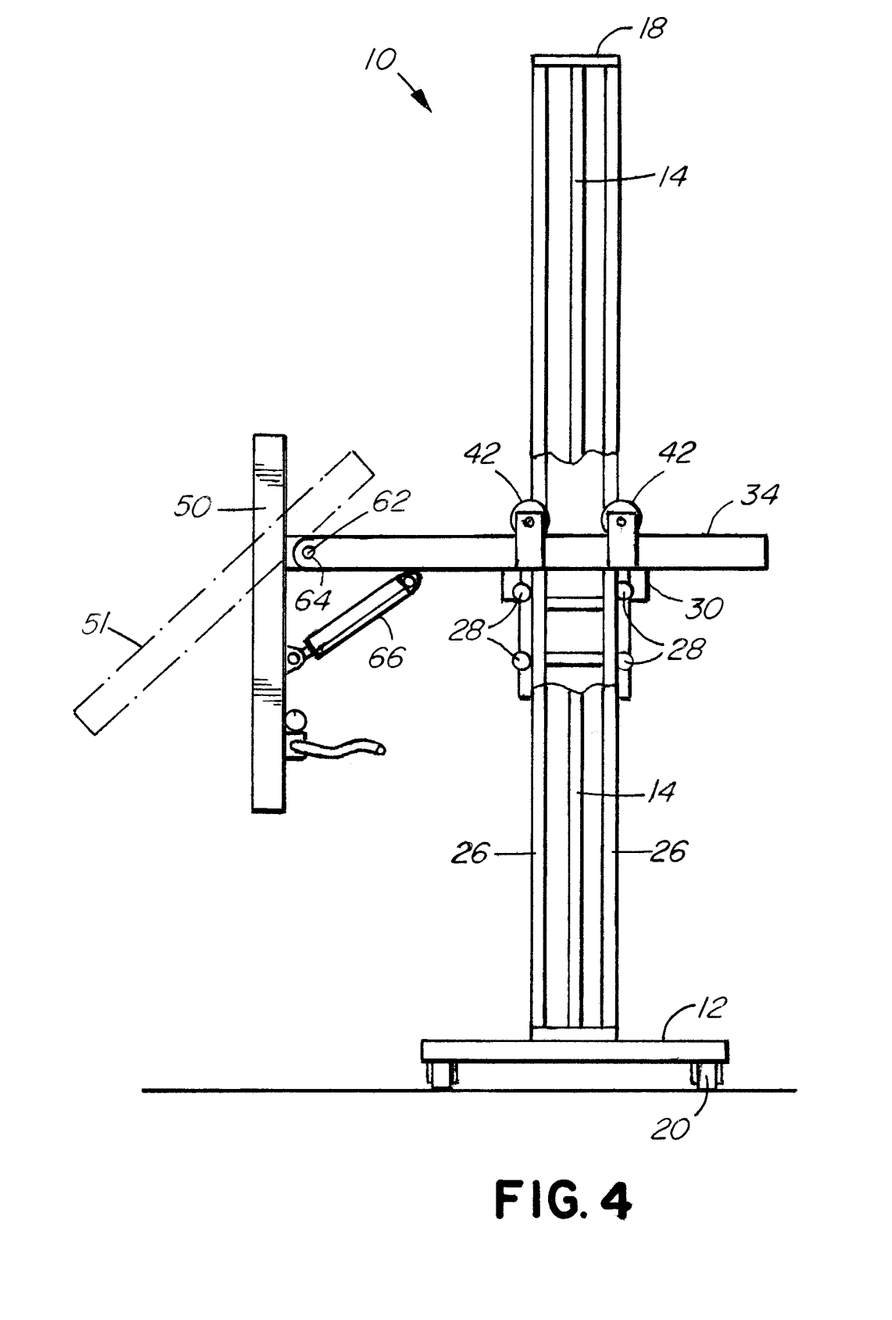
FIG. 4 is a side elevation of the apparatus showing the tilt feature of the nozzle wall.

The attachment of the nozzle wall 50 to the elongated member 34 is a pivoting one about a horizontal axis 62, as best illustrated in FIG. 4. According to the preferred embodiment, the attachment point is a hinge 64 and pivoting is actuated by a hydraulic cylinder 66 extending from the elongated member 34 to the nozzle wall Pivoting of the nozzle wall 50 acts to present the nozzle wall 50 at an inclined angle (position 51) with respect to the vertical plane allowing the water to be directed at an upward angle. The angle may be selected to be substantially normal to the overhanging inclined surface 1, 4. Preferably, nozzles 52 rotate in use, as shown by arrows 70.

FIG. 5 shows the apparatus of the preferred embodiment in use to treat an overhanging wall surface 1. Cylinder 66 has been actuated to pivot the nozzle wall 50 at an angle that corresponds to the inclination angle of surface 1. Nozzles 52 are thereby able to direct high-pressure water toward the surface 1 in a direction 72 that is substantially normal to the surface 1.

Figure 6A:
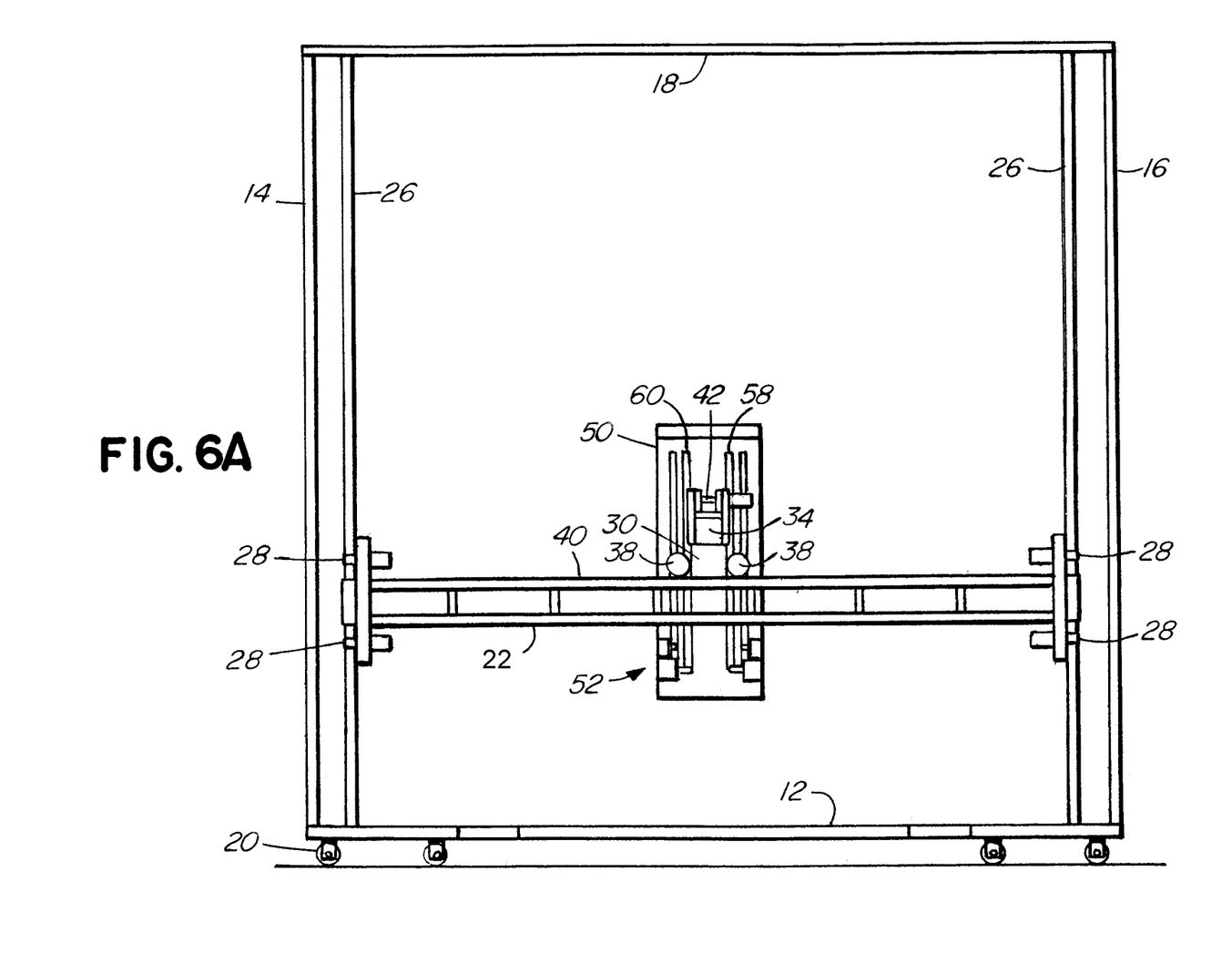
FIG. 6A is a rear view taken along lines 6A-6A of FIG. 6.

FIGS. 6, 6A, 7, 7A and 7B illustrate the use of the apparatus to treat a curved wall comprising non-vertical inclined portions 80, 82 and including an overhanging portion 84. In FIGS. 6 and 6A, the carriageway 22 is positioned vertically along the sides 14, 16 so that the nozzle wall 50 aligns with an overhanging portion 84 of the boat hull 4. Cylinder 66 has also been actuated so as to present the nozzle wall 50 substantially parallel with portion 84 so that the nozzles 52 may direct high-pressure water at a substantially normal angle (as indicated by arrow 72) to the hull portion 84. Elongated member 34 has been extended to be proximal to the hull portion 84. FIG. 6A is a rear view of the installation of FIG. 6 showing the carriage 30 about mid-way along the lateral extent of the carriageway 22. In operation, carriage 30 is reciprocated horizontally along the length of carriageway 22 to treat a horizontal swath of the wall surface.

Figure 7A:
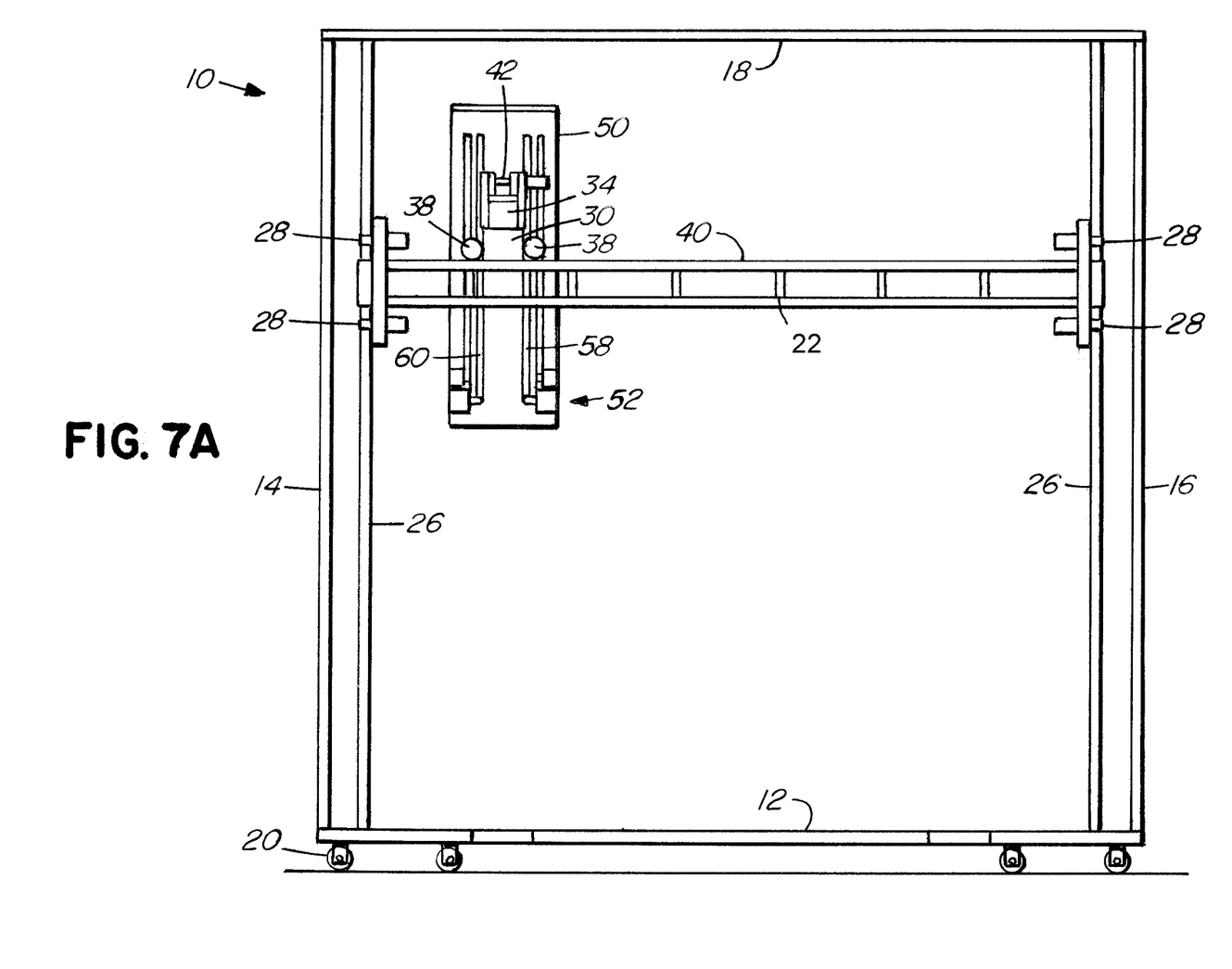
FIG. 7A is a rear view taken along lines 7A-7A of FIG. 7.
Figure 7B:
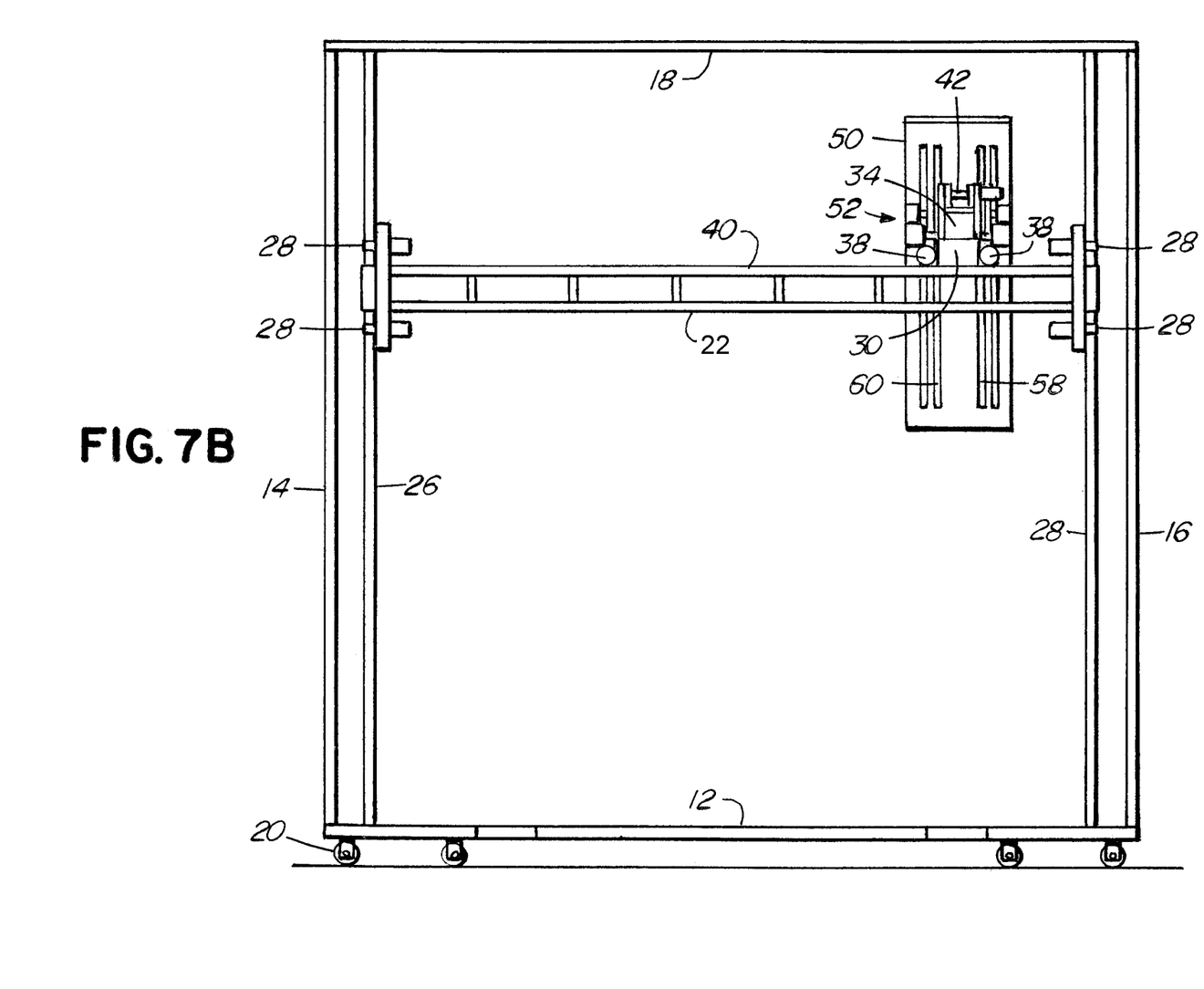
FIG. 7B is a rear view of the installation of FIG. 7 with the carriage displaced to the right and the nozzles displaced to the upper portion of the nozzle wall.

In FIGS. 7 and 7A, the carriageway 22 has been displaced upward in relation to its position in FIGS. 6 and 6A so as to reach the higher hull portion 82. Cylinder 66 has been retracted to make the nozzle wall 50 substantially parallel with portion 82 and elongated member 34 has been withdrawn to accommodate the relative proximity of portion 82 to the apparatus 10. In FIGS. 7 and 7A the nozzles 52 are disposed in the lower portion of the nozzle wall 50 and the carriage is disposed in the left portion of the carriageway 22. In FIG. 7B, the carriage 30 has travelled to the right portion of the carriageway 22 and the nozzles have reciprocated to an upper portion of the nozzle wall 50.

It will be appreciated that the translation of the carriage 30 along the carriageway and of the nozzles 52 vertically along slots 58, 60 (i.e along straight elongated track 57) allow the apparatus to treat a horizontal swath of the wall surface. Displacement of the carriageway 22 vertically in relation to the side members 14, 16 allows a vertical extent of the wall surface to be treated.

In an exemplary operation, the apparatus is positioned a suitable distance from the overall surface to be treated having regard to the reach of the elongated member 34. The carriageway 22 is position sufficiently low along the sides 14, 16 to align the nozzle wall 50 with the lowermost portion of the surface 4. The cylinder 66 is actuated to angle the nozzle wall 50 to be parallel with the lowermost portion of the surface 4 to be treated and the elongated member is extended to bring the nozzle wall in proximity to the surface 4.

The nozzles 52 are actuated to direct jets of water toward the surface as the nozzles are reciprocated along the longitudinal extent of the nozzle wall 50 along slots 58, 60, allowing the nozzles to work a vertical extent of the surface 4. At each nozzle reciprocation cycle, the carriage 30 is incremented laterally along carriageway 22 to gradually work a horizontal extent of the surface 4. Once the carriage 30 has incremented the full lateral extent of the carriageway 22, the carriageway 22 is incremented vertically, with a corresponding adjustment of cylinder 66 and elongated member 34 to maintain a consistent spacing of nozzle wall 50 from the surface 4 and to maintain a substantially parallel (or substantially tangent where the surface curves sharply) relationship to the surface 4. The nozzles 52 are actuated and reciprocated along the nozzle wall 50 once again, and at each reciprocation cycle, the carriage 30 is incremented laterally. The process is repeated for the various parts of the overall surface 4 by selectively actuating the cylinder 66 to maintain the nozzle wall 50 in a substantially parallel or tangent relationship with the local surface to be worked, by retracting or extending the elongated member 34 to maintain a consistent spacing between the nozzle wall 50 and the local surface 4 and by raising or lowering the carriageway 22 to accommodate the different heights of the local surface 4.

While the preferred embodiment has been described by reference to the use of a substantially planar nozzle wall 50 with the straight elongated track 57 comprising slots 58, 60 formed therein, any straight track 57 along which the nozzles may be guided would be suitable, provided that the track 57 may be angled to be substantially parallel to the overhanging or inclined portion of the surface to be treated, or if the portion is curved, parallel to a proximate tangent of that portion.

The invention provides the ability to use a single apparatus that is adapted to offer several degrees of freedom in orienting and positioning nozzles to work the surface, including orienting a nozzle wall at an angle that is substantially parallel or tangent to an overhanging segment of a surface to be treated.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention claimed is:

1. A method of treating a surface using pressurized water, said surface having a portion that is inclined with respect to a vertical plane, comprising:
   providing an apparatus having:
      a vertically extending frame;
      a horizontally extending carriageway movable in a vertical direction along said frame;
      a carriage displaceable horizontally along said carriageway;
      an elongated member mounted to said carriage, said elongated member extendible and retractable in a direction perpendicular to said carriageway; and
      a straight elongated track mounted to an end of said elongated member for guiding one or more water nozzles along said track;
      said track pivotable about a horizontal axis so as to present said track at an inclination with respect to the vertical plane; and
   positioning said frame adjacent said surface in a first position and while said frame is in said first position:
      positioning said carriageway at a vertical height in relation to said frame, said carriage in relation to said carriageway and said elongated member in relation to said carriage, so as to present said track proximate to said portion of said surface;
      angling said track such that a longitudinal axis of said track is substantially parallel to said portion or to a tangent to said portion; and
   actuating said nozzles to direct pressurized water toward said portion.

2. The method of claim 1 further comprising the steps of:
   moving said nozzles along said track; and
   moving said carriage horizontally along said carriageway;
   as said nozzles emit pressurized water toward said surface whereby to treat a horizontal swatch of said surface.

3. The method of claim 2 further comprising the steps of:
   modifying a vertical position of said carriageway in relation to said frame; and
   repeating the steps of claims 1 and 2 in said modified vertical position of said carriageway.

4. The method of claim 1, wherein said straight elongated track comprises a substantially planar wall pivotably coupled to said end of said elongated member and at least one slot formed in said wall and extending along a longitudinal axis of said wall, said nozzles configured to reciprocate along said at least one slot.

* * * * *